United States Patent [19]
Griffith et al.

[11] 3,993,631
[45] Nov. 23, 1976

[54] POLYPHTHALOCYANINES PREPARED FROM N,N-BIS(3,4-DICYANOPHENYL) ALKANEDIAMIDES

[75] Inventors: James R. Griffith, Riverdale Heights; Jacques G. O'Rear, Temple Hills, both of Md.

[73] Assignee: The United States of America as represented by the Secretary of the Navy, Washington, D.C.

[22] Filed: Aug. 23, 1974

[21] Appl. No.: 500,209

[52] U.S. Cl. .......................... 260/78 TF; 260/78.41; 260/465 D; 428/474
[51] Int. Cl.[2] ......................................... C08G 73/06
[58] Field of Search ........ 260/78 TF, 78.4 N, 465 D

[56] References Cited
UNITED STATES PATENTS

| | | | |
|---|---|---|---|
| 3,245,965 | 4/1966 | Tuemmler | 260/78.4 |
| 3,654,192 | 4/1972 | Vogel | 260/2 R |
| 3,775,380 | 11/1973 | Miller | 260/78.4 N |
| 3,826,783 | 7/1974 | Bloch | 260/47 CZ |
| 3,836,506 | 9/1974 | Frost | 260/47 CP |
| 3,864,309 | 2/1975 | Bilow et al. | 260/47 UA |

OTHER PUBLICATIONS

Griffith and Walton, "Resin Systems Cured Through Aromatic Ortho Dinitrile Group" *Coatings and Plastics, Preprints*, 34, No. 1, 784 (4/74).

Griffith and Walton, "Resin Systems Cured Through Aromatic Ortho Dinitrile Group", *Polymer Preprints* 15, No. 1, 787–790 (4/74).

*Primary Examiner*—Lester L. Lee
*Attorney, Agent, or Firm*—R. S. Sciascia; Philip Schneider; Thomas McDonnell

[57] ABSTRACT

N,N'-bis(3,4-dicyanophenyl) alkanediamides of the general formula:

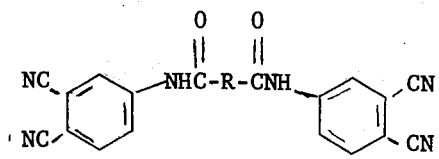

wherein $R = (CH_2)_{n-2}$ and $(CH_2)_x CH(CH_3)(CH_2)_y$; $n = 3$ to 20; $x = 1$ to 8; and $y = 1$ to 8, prepared by reacting 4-aminophthalonitrile with a saturated aliphatic dicarboxylic acid halide. These dinitriles readily polymerize through heating by themselves or with a metal or with a salt to form polyphthalocyanine resins, of the infinite molecular weight type which are useful as coatings, laminates, adhesives, filament windings, and castings. The general formulas for these polyphthalocyanine resins are:

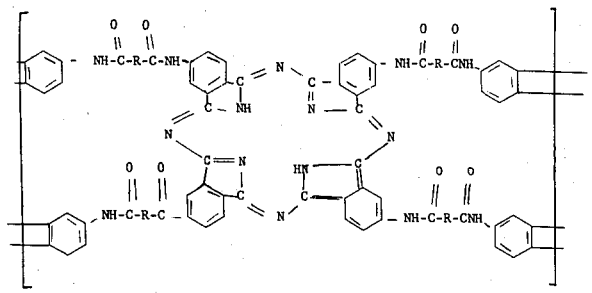

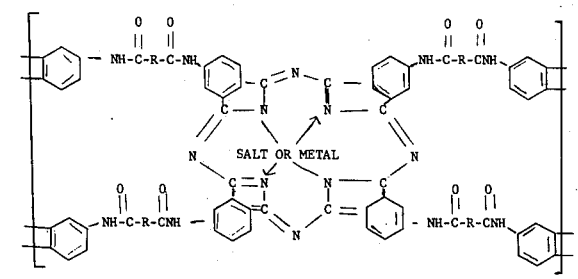

wherein $R = (CH_2)_{n-2}$ and $(CH_2)_x CH(CH_3)(CH_2)_y$; $n = 3$ to 20; $x = 1$ to 8; and $y = 1$ to 8.

6 Claims, 1 Drawing Figure

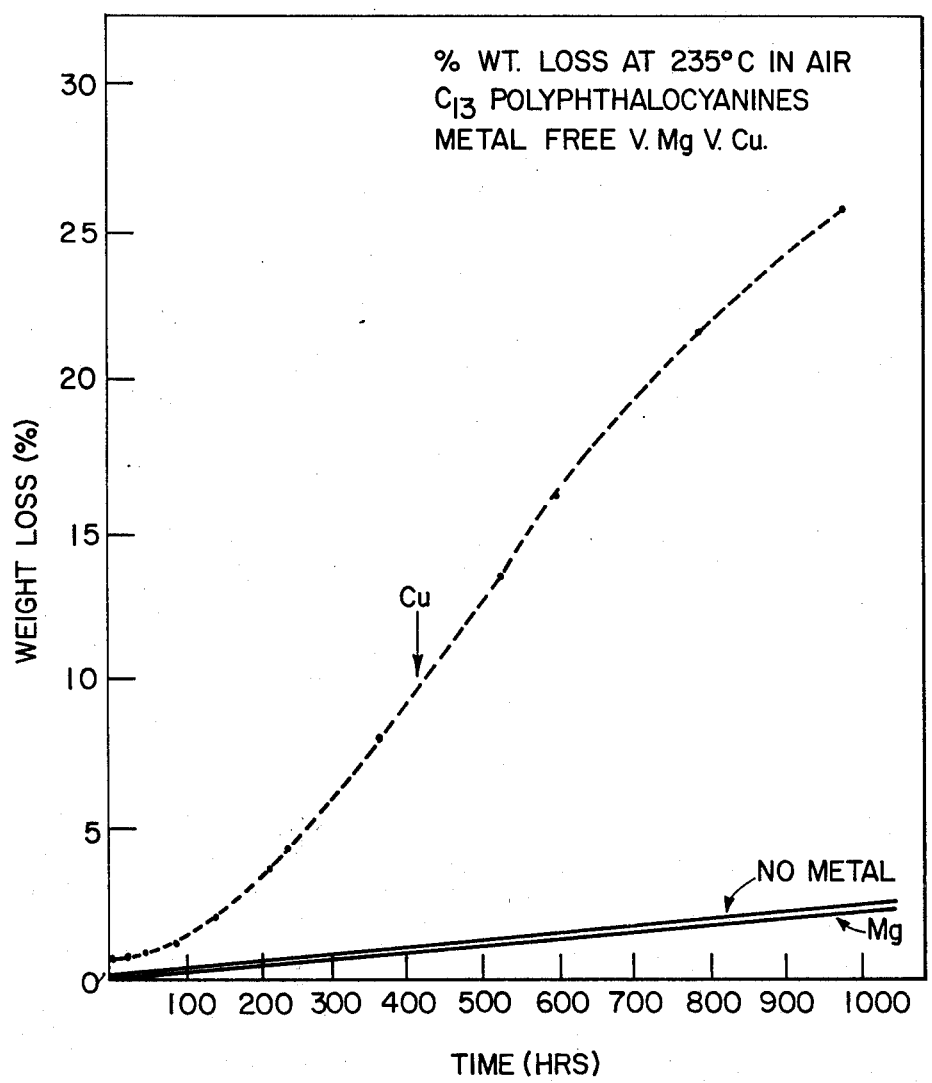

POLYPHTHALOCYANINES PREPARED FROM N,N-BIS(3,4-DICYANOPHENYL) ALKANEDIAMIDES

BACKGROUND OF THE INVENTION

1. Field of the Invention

The present invention relates generally to diphenyldiamides and plastics and more particularly to dicyanophenylakanediamides and polyphthalocyanine plastics.

2. Description of the Prior Art

Since the two nitrile groups on each ring of the N,N'-bis-(3,4-dicyanophenyl) alkanediamides of this invention form the phthlocyanine nucleus, these compounds are referred to hereinafter as bisorthodinitriles.

Resin is used herein in its conventional sense. It is any of a large class of high molecular weight substances having a tendency to flow when subjected to stress and is used chiefly in plastics and and adhesives or for ion exchange. A resin is either a very viscous liquid or solid that softens gradually when heated in its uncured state. Curing is the process by which a substance irreversibly changes physical states through a chemical reaction. With a resin, curing causes no evolution of volatile materials and this is considered a major advantage of resins. After a resin is cured, the compound is referred to as a plastic.

A major disadvantage of known resins and plastics is the inability to withstand temperatures in excess of 200° C for more than a few hours without permanent damage to the coating, adhesive, or articles made therefrom. Most completely decompose at 200° C. This drawback arises from the instability of the chemical bonds occuring in the presently used resins and plastics.

A chemical structure possessing greater thermal stability than the linkages used in known resins, e.g., urethane, epoxide, polysulfide, or amide is the phthalocyanine nucleus. It is theorized that the previous attempts to form high molecular weight resins with this structure have failed mainly because of steric difficulties encountered in forming the extremely flat phthalocyanine polymer. Exemplary of prior efforts is the reacting of a tetrabasic acid derivative with a metal salt, urea, and vanadata or molybdate promoter, or cocondensing tetracyanodiphenyl ether and phthalonitrile with copper bronze. These, like the other approaches, only produce a monomer or a low molecular weight polymer. No phthalocyanine polymer of the infinite molecular weight type or one with a high molecular weight has yet been produced.

SUMMARY OF THE INVENTION

It is therefore an object of this invention to provide a novel class of organic compounds.

A further object is to provide a novel class of bisorthodinitriles.

A further object is to provide a method of preparing the above novel class of bisorthodinitriles.

A still further object is to provide a compound which polymerizes in a high yield to form polyphthalocyanine resins.

Also an object of this invention is to provide a novel class of resins useful for producing coatings, high strength structural materials, laminates, filament windings, adhesives, and castings.

Another object of this invention is to provide a novel class of resins capable of withstanding temperatures up to 200° C without degradation, up to 250° C with slight degradation, and up to 350° C with moderate degradation.

Another object is to provide a novel class of resins as versatile as epoxy resins but with greater thermal stability.

Another object is to provide a novel class of resins with a structural strength comparable to epoxy resins but with a greater thermal stability.

And another object of this invention is to provide an adhesive with greater adhesion than epoxy adhesives above 200° C.

And still another object of this invention is to provide a novel class of polyphthalocyanine plastics of the infinite molecular weight type.

Also an object of this invention is to provide a method of preparing polyphthalocyanine resins.

These and other objects are achieved by a novel class of compounds having a general formula of:

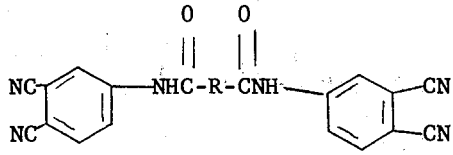

wherein $R = (CH_2)_{n-2}$ and $(CH_2)_x CH(CH_3)(CH_2)_y$; $n = 3$ to 20; $x = 1$ to 8; and $y = 1$ to 8.

This new class of compounds polymerizes upon heating by themselves or with the addition of a metal to form a novel class of polyphthalocyanine resins having the general formulas:

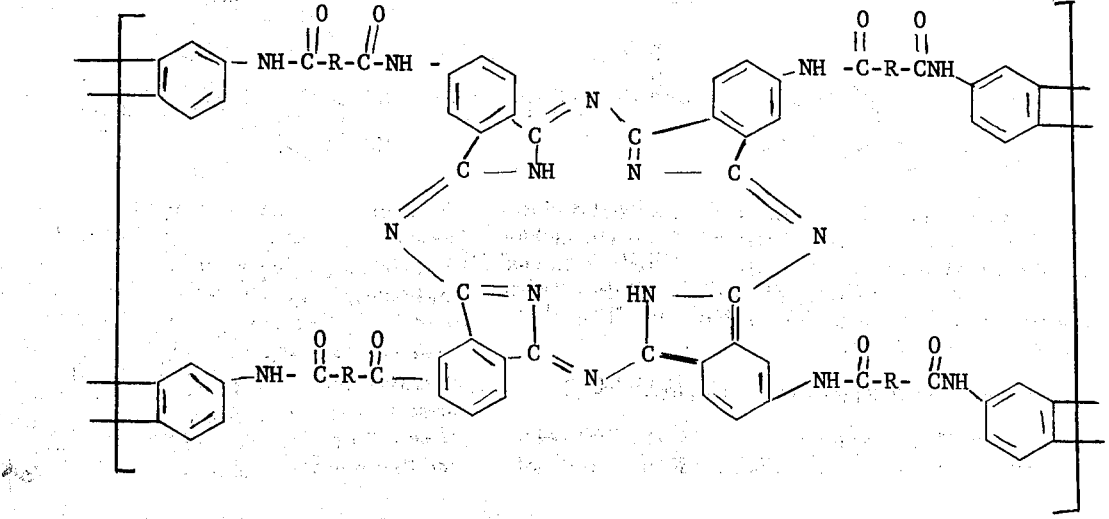

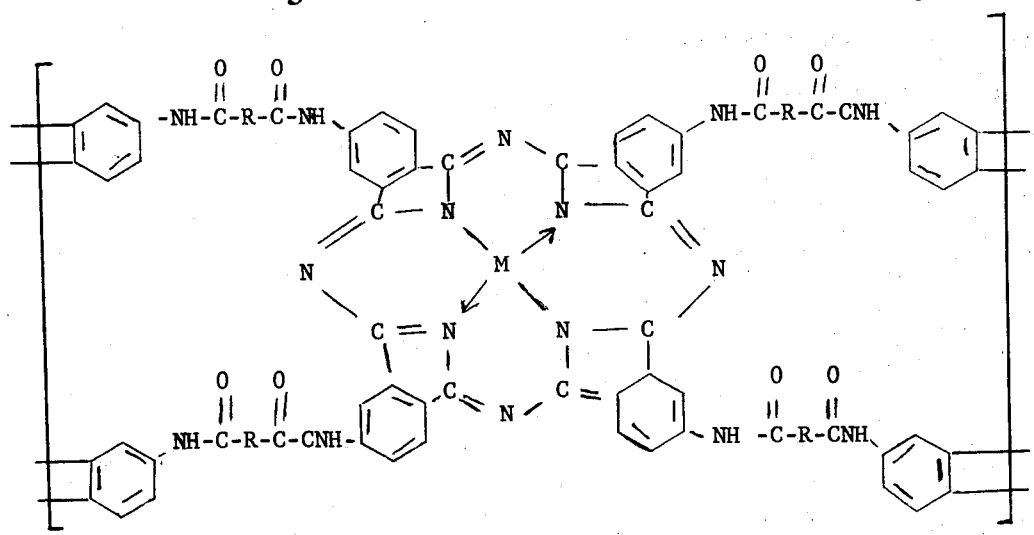

wherein $r = (CH_2)_{n-2}$ and $(CH_2)_x CH(CH_3)(CH_2)_y$; $n = 3$ to 20; $x = 1$ to 8; $y = 1$ to 8 and M is a metal selected from the group consisting of Cr, Mo, Va, Be, Ag, Hg, Al, Sn, Pb, Sb, Ca, Ba, Cd, Mn, Mg, Zn, Cu, Fe, Co, Ni, Pd, and Pt.

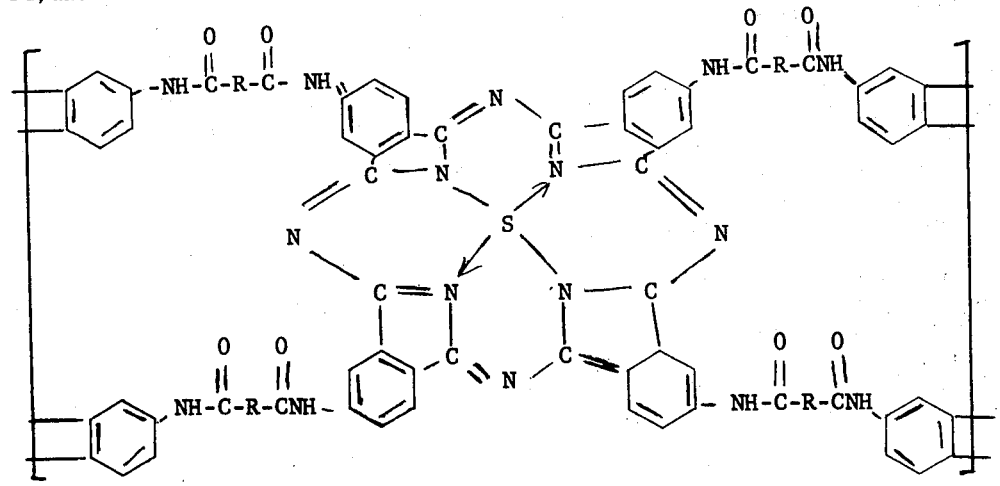

wherein $R = (CH_2)_{n-2}$ and $(CH_3)_x CH(CH_3)_x(CH_2)_y$; $n = 3$ to 20; $x = 1$ to 8; $y = 1$ to 8 and S is a salt selected from the group consisting of cuprous chloride, cuprous bromide, cuprous cyanide, cuprous ferricynide, zinc chloride, zinc bromide, zinc iodide, zinc cyanide, zinc ferrocyanide, zinc acetate, zinc sulfide, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, and tannic chloride.

BRIEF DESCRIPTION OF THE DRAWING

The FIGURE is a comparison at 235° C of the thermal stability of metal free tridecanediamide polyphthalocyanine ($C_{13}$) with copper tridicane diamide polyphthaclocynine with magnesium tricicanediamide polyphthacloyanine.

Detailed Description of the Invention

The reaction producing the novel class of bisorthodinitriles of this invention can be schematically represented as follows:

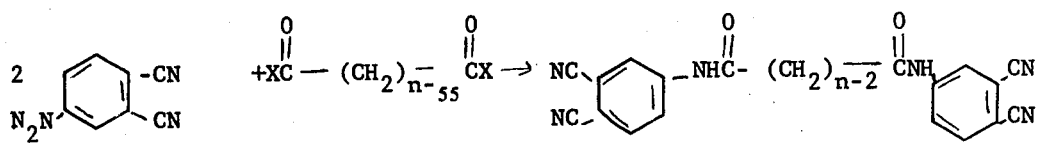

wherein $n$ is an integer from 3 to 20 and $x$ is a halide. In practice, a solution of a saturated aliphatic acid halide in a suitable solvent, e.g. carbon tetrachloride is slowly added to a solution of 4-aminophthalonitrile in pyridine or the like under agitation.

The two reactants are added in about stoichiometric amounts. The solvents should be used in an amount at least sufficient to dissolve the solutes. Since the coupling reaction is instantaneous, the amount of agitation and the rate of addition should be such as to insure an even and rapid distribution of the reactants. Recrystallization is utilized to improve the purity of the bisorthodidinitriles. The recrystallization solvent may be methyl cyanide, methanol, and dimethyl formamide, and the like. The preferred solvents are given in Table I.

The next four examples are given as specific illustrations of the preparation of four bisorthodinitriles of this invention. These examples are not intended to limit, in any manner, the scope of the instant invention or the claims to follow.

EXAMPLE I

The bisorthodinitrile for $n = 5$

N,N'-bis(3,4-dicyanophenyl) pentanediamide (V). A solution of glutaryl chloride (2.79 g; 0.018 mole) in carbon tetrachloride (15 ml) is added dropwise to a stirred solution of 4-aminophthalonitrile (5.15 g; 0.036 mole) in pyridine (150 ml) during 25 minutes. Carbon tetrachloride (150 ml) is added and the final mixture is cooled in an ice bath. The resulting white precipitate is collected, washed with carbon tetrachloride (2 × 15 ml) and dried. The residue is dispersed in water (200 ml), collected, water washed and dried to yield 4.9 g of the crude diamide. Recrystallization from a mixture of dimethyl formamide (50 ml) and toluene (50 ml) at −50° C, followed by a methyl alcohol wash (100 ml), lead to 4.7 g of V as analytical white crystals with properties reported in Table I.

EXAMPLE II

The bisorthodinitrile for $n = 10$

N,N'-bis(3,4-dicyanophenyl) decanediamide (XI). A solution of sebacyl chloride (14.35 g; 0.06 mole) in carbon tetrachloride (50 ml) is added dropwise to a stirred solution of 4-aminophthalonitrile (17.18 g; 0.12 mole) in pyridine (473 ml) during 25 minutes. Carbon tetrachloride (450 ml) is added and the final mixture is cooled in an ice bath. The resulting white precipitate is collected, washed with carbon tetrachloride (2 × 30 ml) and dried. The residue is dispersed in water (200 ml), collected, water washed and dried to yield 24.1 g of the crude diamide. Two recrystallizations from acetonitrile (2 × 180 ml) followed by a methyl alcohol wash (200 ml), lead to 17.2 g of XI as analytical white crystals with properties reported in Table I.

EXAMPLE III

The disorthodinitrile for $n = 13$

N,N'-bis(3,4-dicyanophenyl) tridencanediamide (XIII). A solution of brassylylchloride (9.81 g; 0.035 mole) in carbon tetrachloride (25 ml) is added dropwise to a stirred solution of 3-aminophthalonitrile (10.0 g; 0.070 mole) in pyridine (250 ml) during 25 minutes. Carbon tetrachloride (225 ml) is added and the final mixture is cooled in an ice bath. The resulting white precipitate is collected, washed with carbon tetrachloride (2 × 15 ml) and dried. The residue is dispersed in water (200 ml), collected, water washed and dried to yield 15.9 g of the crude diamide. Three recrystallizations from acetonitrile (3 × 160 ml) followed by a methyl alcohol wash (200 ml lead to 11.5 g of XIII as analytical white crystals with properties reported in Table I.

EXAMPLE IV

The bisorthodinitrile for $n = 18$

N,N'-bis(3,4-dicyanophenyl) octadecanediamide (XV). A solution of octadecanedioyl chloride (6.43 g; 0.018 mole) in carbon tetrachloride (15 ml) is added dropwise to a stirred solution of 4-aminophthalonitrile (5.15 g; 0.036 mole) in pyridine (150 ml) during 25 minutes. Carbon tetrachloride (150 ml) is added and the final mixture is cooled in an ice bath. The resulting white precipitate is collected, washed with carbon tetrachloride (2 × 15 ml) and dried. The residue is dispersed in water (200 ml), collected, water washed and dried to yield 6.8 g of the crude diamide. Three recrystallizations from acetonitrile (3 × 100 ml) followed by a methyl alcohol wash (100 ml) lead to 4.0 g of XV as analytical white crystals with properties reported in Table I.

As prepared in the purified form, the bisorthodinitriles are white, crystalline solids with melting points above 160° C. The melts are syrups with free-flow characteristics. Glasses may be obtained by rapid cooling of the melt to room temperatures. Twelve of the bisorthodinitriles of this invention, which were prepared by the above method, have been analyzed and the results are summarized in Table I.

Table 1

N,N'-Bis(3,4-Dicyanophenyl) Alkanediamides $$\text{NC-}\underset{\text{NC}}{\text{C}_6\text{H}_3}\text{-NHC(O)(CH}_2)_{n-2}\text{C(O)NH-}\underset{\text{CN}}{\text{C}_6\text{H}_3}\text{-CN}$$

| Compound Designation | n | Yield % | Mp °C | Recryst. Solvent | Empirical Formula | Calcd. % C | Calcd. % H | Calcd. % N | Found. % C | Found. % H | Found. % N |
|---|---|---|---|---|---|---|---|---|---|---|---|
| IV | 4 | 55 | 300–302 | C₆H₆-DMF 70:30 | C₂₀H₁₂N₆O₂ | 65.21 | 3.28 | 22.83 | 64.96 | 3.20 | 22.75 |
| V | 5 | 68 | 256–259 | Toluene-DMF 50:50 | C₂₁H₁₄N₆O₂ | 65.96 | 3.69 | 21.98 | 65.86 | 3.59 | 21.83 |
| VI | 6 6* | 73 | 320–323 | DMF | C₂₂H₁₆N₆O₂ | 66.66 | 4.07 | 21.20 | 66.41 | 4.02 | 21.03 |
| VII | (3 Me) | 61 | 203–206 | MeOH | C₂₃H₁₈N₆O₂ | 67.31 | 4.42 | 20.48 | 67.47 | 4.44 | 20.40 |
| VIII | 7 | 63 | 227–230 | MeOH-H₂O 90:10 | C₂₃H₁₈N₆O₂ | 67.31 | 4.42 | 20.48 | 67.57 | 4.24 | 20.42 |
| IX | 8 | 53 | 255–258 | CH₃CN | C₂₄H₂₀N₆O₂ | 67.91 | 4.75 | 19.80 | 67.71 | 4.79 | 19.74 |
| X | 9 | 63 | 181–183 | MeOH | C₂₅H₂₂N₆O₂ | 68.48 | 5.06 | 19.17 | 68.60 | 5.12 | 19.08 |

Table 1 -continued

N,N'-Bis(3,4-Dicyanophenyl) Alkanediamides

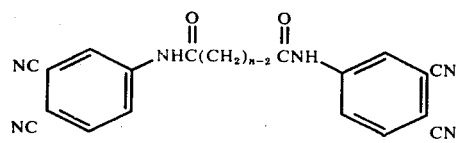

| Compound Designation | n | Yield % | Mp ° C | Recryst. Solvent | Empirical Formula | Calcd. % C | H | N | Found. % C | H | N |
|---|---|---|---|---|---|---|---|---|---|---|---|
| XI | 10 | 63 | 192–194 | CH₃CN | C₂₆H₂₄N₆O₂ | 69.01 | 5.35 | 18.57 | 69.05 | 5.23 | 18.39 |
| XII | 12 | 73 | 163–165 | CH₃CN | C₂₈H₂₈N₆O₂ | 69.98 | 5.87 | 17.49 | 69.92 | 5.65 | 17.35 |
| XIII | 13 | 71 | 178–181 | CH₃CN | C₂₉H₃₀N₆O₂ | 70.42 | 6.11 | 16.99 | 70.28 | 5.97 | 16.79 |
| XIV | 14 | 50 | 163–165 | CH₃CN | C₃₀H₃₂N₆O₂ | 70.84 | 6.34 | 16.52 | 71.04 | 6.38 | 16.29 |
| XV | 18 | 60 | 163–166 | CH₃CN | C₃₄H₄₀N₆O₂ | 72.31 | 7.14 | 14.88 | 72.22 | 7.10 | 14.75 |

*The linkage between the two carbonyl groups is —CH₂CH(CH₃)CH₂CH₂—

The preparation of the starting material, 4-aminophthalonitrile, in sufficient purity is difficult. The preferred method of preparation is summarized as follows:

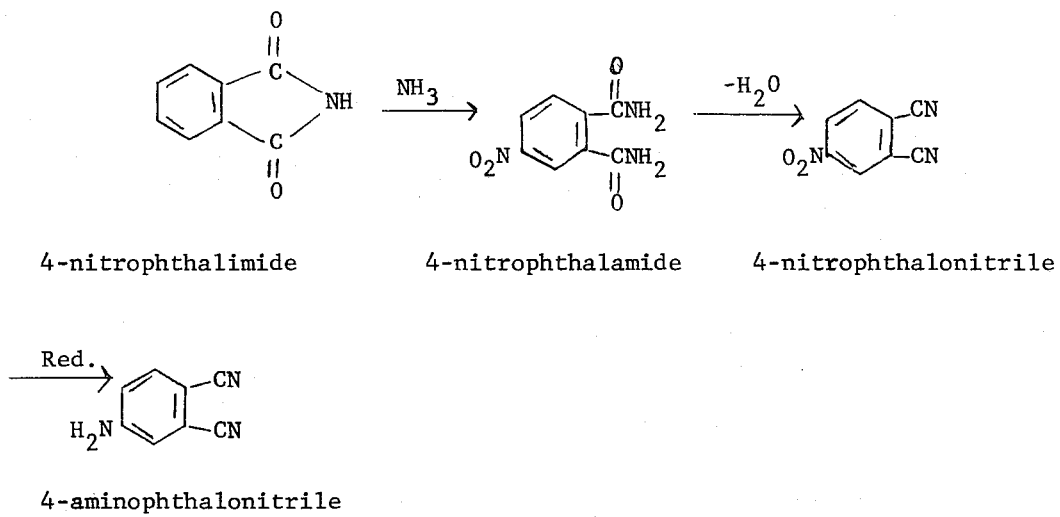

The preferred synthesis of 4-aminophthalonitrile begins with 4-nitrophthalimide. A diamide is formed and then is dehydrated by a process which comprises adding 4-nitrophthalimide to a stirred solution of ammonium hydroxide at room temperature in imide to NH₃OH mole ratio of at least about 25:1. With continued stirring, a mild external heating is applied to bring the solution to a temperature from about 40° C to about 45° C and is continued until the frothing ceases which occurs in about one hour. The resulting precipitate is collected, washed, and then dried. This precipitate is 4-nitrophthalamide.

A modification of the method disclosed in U.S. Pat. No. 2,525,620 of Scalera and Bouillard which issued on Oct. 10, 1950 is used to prepare 4-nitrophthalonitrile from 4-nitrophthalamide. The 4-nitrophthalamide is suspended in pyridine and is vigorously stirred. Phosphorus oxychloride in a POCl₃ to amide mole ratio range from about 2.2:1 to about 2.3:1 is added at such a rate that the reaction mixture maintains a temperature range from about 65° to about 70° C. The stirred reaction mixture is maintained at this temperature range for about one hour. At which time the resulting mixture is chilled to a temperature from about 0° C to about 10° C and is neutralized with hydrochloric acid. The purple solid is collected and dried. Upon drying the residue is extracted with ethylacetate and is decolorized with activated charcoal. Next it is washed with sodium hydroxide saturated with sodium chloride and then with water. Drying and evaporation yields the product.

Analytically pure 4-aminophthalonitrile is obtained by first dissolving 4-nitrophthalonitrile in an amount of pyridine or the like at least sufficient to dissolve the solute. The solution is added at a rate no faster than 1.5 mole of 4-nitrophthalonitrile per hour to a stirred solution of 90 weight percent sodium dithionite (sodium hyposulfite) and water. The resulting mixture is stirred for at least about 45 minutes. Water in an amount from about 40 to about 65 moles is added and the mixture is cooled to about 4° C. The resulting white precipitate is collected, washed with cold water, and is recrystallized. These crystals are 4-aminophthalonitrile which is a starting material for the preparation of the bisorthodinitriles of this invention.

The following example is given to better illustrate the method of preparing 4-aminophthalonitrile. This example is not intended to limit, in any manner, the scope of the instant invention or the claims to follow.

EXAMPLE V 4-nitrophthalamide (I)

Commercial 4-nitrophthalimide (500 g; 2.60 moles; mp 196°–200° C) is added quickly to a stirred solution of 15.6 N ammonium hydroxide (3500 ml). With continued stirring, external heating (water bath, 45° C) is applied until frothing ceases (1 hour). The resulting precipitate is collected, washed with ice water (2 × 400ml) then recrystallized with acetone (2 × 400 ml) and dried to yield 440 g of I as pale yellow crystals; yield, 81%, mp 200°–202° C; lit (6) mp 200° C.

4-nitrophthalonitrile (II).

4-nitrophthalamide (220 g; 1.05 moles) is suspended in pyridine (840 ml). Into this vigorously stirred suspension, phosphorus oxychloride (220 ml; 2.40 moles) is added at such a rate that the reaction maintains a temperature range of 65°–70° C during the 30-minute addition time. The same temperature is maintained an additional hour by external heating. The resulting mixture is neutralized with 12 N hydrochloric acid (150 ml). The purple solid is collected by filtration and dried. The residue is extracted with ethyl acetate (3 × 700 ml) and the purple extract is decolorized with activated charcoal, washed first with 0.4N sodium hydroxide saturated with sodium chloride (3 × 70 ml) and then with water (4 × 70 ml). Drying and evaporation of the extract leaves 91 g of II as pale yellow crystals; yield, 50%; mp 142–144°; lit. (7-mp 138°–139°; lit. (4) 142°.

4-aminophthalonitrile (III)

The following procedure provides analytically pure III. 4-nitrophthalonitrile (100 g; 0.576 mole) is dissolved in pyridine (400 ml). The pyridine solution is added dropwise during one hour to a stirred solution of 90% sodium dithionite (475 g; 2.36 mole) and water (2700 ml). The resulting mixture is stirred for an additional hour. Then water (900 ml) is added and the mixture is cooled to 4° C. The white precipitate is collected and washed with cold water (2 × 400 ml). Recrystallization from water (2700 ml) leads to 27.3 of III as light cream colored crystals; mp 181°–183°; yield 33.1%; anal. calcd. for $C_8H_5N_3$; C, 66.93; H, 3.47; N, 29.58. Found : C, 67.03; H, 3.58; N, 29.47.

The most significant use of the bis-orthodinitriles is in the production of phthalocyanine polymers of the infinite molecular weight type. The preparation thereof comprises heating the bis-orthodinitrile crystals at least above their melting point and maintaining that temperature until the polymerization is complete. A polymerization temperature from about 210° to about 240° is preferred even for those bis-orthodinitriles with melting points below 200° C if no metal or salt is added. For the bisorthodinitriles with a melting point above 240° C, the lowest possible temperature is preferred. Because of the effect of high temperatures, polymers prepared from bisorthodinitriles with melting points above 240° C are of poorer quality than the other polyphthalocyanines of this invention. Thus, the preferred bisorthodinitriles of Table I would be the ones with $n = 7, 9, 10–14,$ and 18 and the branched chain example.

The sharp, isolated infrared absorption of the nitrile group at about 2240 $cm^{-1}$ affords a convenient measure of the degree of reaction, although the total spectrum has not been useful as a proof that the reaction is a phthalocyanine formation. From the infrared observation of the decrease in nitrile absorption and from the physical strength development both indicate that a polymerization of approximately 48 hours at 220° C is required to develop the polymeric network to the maximum extent for the tridecanediamide polyphthalocyanine.

The green color which becomes progressively deeper as solidification of the melt occurs is a strong indication that phthalocyanine formation is the principle reaction. Spectral changes which occur as the phthalocyanine polymer is formed have not so far been definitive except with regard to nitrile diminution.

Based primarily upon the intense color development, the equal ease with which bisorthodinitrile with different chain lengths polymerize, and the physical changes which are obvious e.g. liquid to solid, it is hypothesized that a poly phthalocyanine forms according to the following reaction:

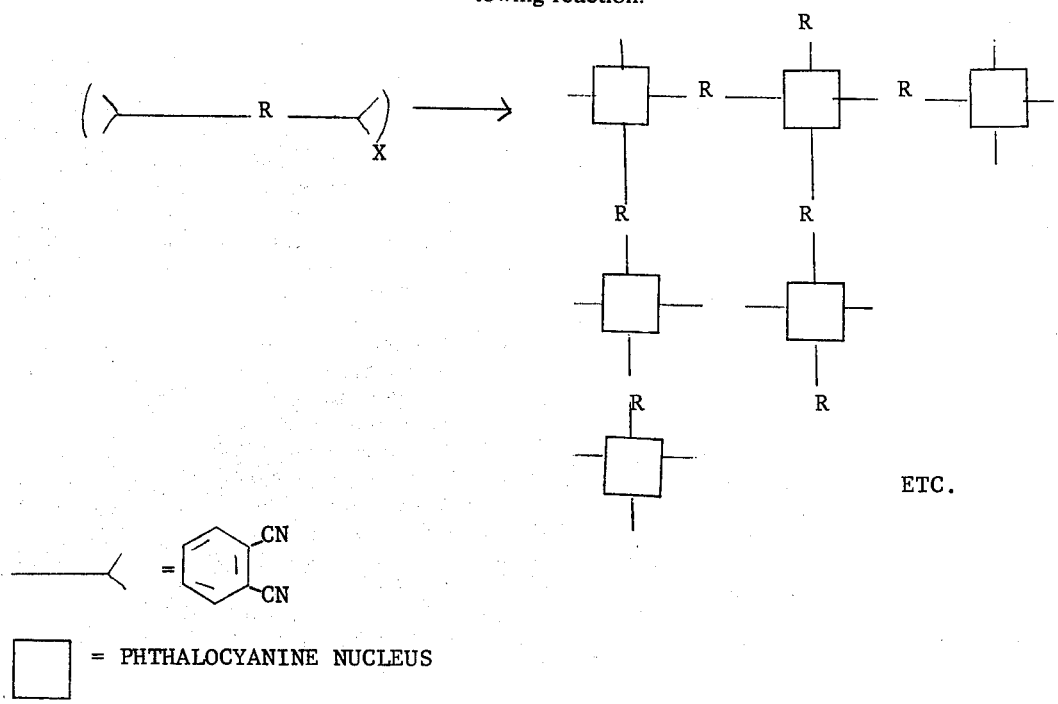

The effect of the R on the reaction is to provide enough separation between the two dinitrile groups so that they are not hindered in forming the phthalocyanine nucleus.

Polymerization also occurs with the inclusion of a metal and certain salts. The metals tested so far act to speed the polymerization, i.e. time and preferred temperatures are lower and effect the properties of the resulting plastic. If a metal is used, a temperature as low as the melting point of the bisorthodinitrile is preferred even for those with a melting point below 200° C. The preferred bisorthodinitriles are the same as given hereinbefore.

For example, when a melt of N,N'-bis(3,4-dicyanophenyl) tridecanediamide containing a suspension of clean copper flake (activated copper bronze pigment) in about a stoichiometric amount is heated slightly above 180° C, a green tint soon developed uniformly throughout. The uniformity of the color development is depended upon the uniformity of the copper dispersion. The material was cured at 220° C for 48 hours.

Metals which were utilized in the preparation monomeric metal phthalocyanines and the low molecular weight polymeric metal phthalocyanines can be used to prepare the infinite molecular weight type of phthalocyanine polymers of this invention. Exemplary of these metals are chromium, molybdenum, vanadium, beryllium, silver, mercury, aluminum, tin, lead, antimony, calcium, barium, and cadmium. The preferred metals are manganese, magnesium, zinc, copper, iron, cobalt, nickel, palladium, and platinum. Mixtures of the above metals may also be used.

Metal salts may also be employed. The major effect associated with their use is foaming. Any of the previously used salts in preparing phthalocyanine monomers or low molecular weight polymers may be used in the practice of this invention. Suitable metal salts are cuprous chloride, cuprous bromide, cuprous cyanide, cuprous ferricyanide, zinc chloride, zinc bromide, zinc iodide, zinc cyanide zinc, ferrocyanide, zinc acetate, zinc sulfide, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, and mixtures thereof. The resulting plastic is lower in density and structural strength due to the foaming caused by the inclusion of the salt.

In summary, the preparation of polyphthalocines with a metal or salt comprises mixing the bisorthodinitriles with the salt(s) or metal(s) and then heating the mixture at least above the melting point of the bisorthodinitrile(s). Complete polymerization is achieved preferably by heating the mixture to a temperature from about 210° C to about 240° C until the infrared analysis shows the reaction to be complete. Since the salt or metal becomes part of the phthalocyanine nucleus, decreasing the particle size provides a more efficient utilization of the salt or metal. Thus, particle sizes up to 2000 are preferred. Since amounts of the included metal in excess of the stoichiometric amount cause foaming and the excess is not used, the preferred amount of metal to be used is about the stoichiometric amount. However, if a foam is desired, then an amount in excess of the stoichiometric amount would be used. For the salts, approximately the stoichiometric amount is to be preferred. The preferred bisorthodinitriles for the metal or salt polyphthalocyanines are the same as for the metal free polyphthalocyanines.

To illustrate the heat stability of the polyphthalocyanine plastics, a sample of copper tridecanediamide polyphthalocyanine was heated at 300° C in air. A gradual weight loss of approximately 2% per day took place. Filings of a sample at this temperature gradually acquired a brownish tint and lost the distinct green color of the original plastic. The structural integrity of the plastic was retained for about 7 days at this temperature. It is presently unknown whether the decomposition is occuring at the phthalocyanine nucleus, at the amide linkage or as a result of unreacted ortho-dinitriles in the polymeric network.

The variation in heat stability of polyphthalocyanine plastics caused by the presence and selection of a metal is shown in the figure. Tricecanediamide polyphthalocyanine, copper tridecanediamide polyphthalocyanine, and magnesium tridecanediamide polyphthalocyanine were heated at 235° C in air. Although all three show exceptional thermal stability, the metal free and magnesium polyphthalocyanines show a significantly greater thermal stability than the copper polyphthalocyanine. It is concluded that this difference is caused by the catalytic action of copper on the decomposition mechanism.

Table II shows the affect of temperature on the structural strength of a typical polyphthalocyanine plastic of this invention.

TABLE II

| Shear Modulus of $C_{13}$ Polyphthalocyanine | |
|---|---|
| Temp °C | S.M psi |
| 25 | 122,000 |
| 250 | 87,000 |

As the test results show the polyphthalocyanine plastics of this invention have strength levels which are sufficiently high to be useful in practical applications, particularly that of matrix materials for glass and carbon fiber reinforced composites. Although the adhesive properties of the polyphthalocyanines do not appear as generally useful as those of epoxies, the polyphthalocyanines of this invention have useful adhesiveness above the decomposition temperature of epoxies. In summary the particular importance of this invention is the providing of a new class of plastics which are comparable to epoxides and other similar plastics in versatility, strength and cost, but have a much higher decomposition temperature.

Obviously many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A polyphthalocyanine resin having the general formula:

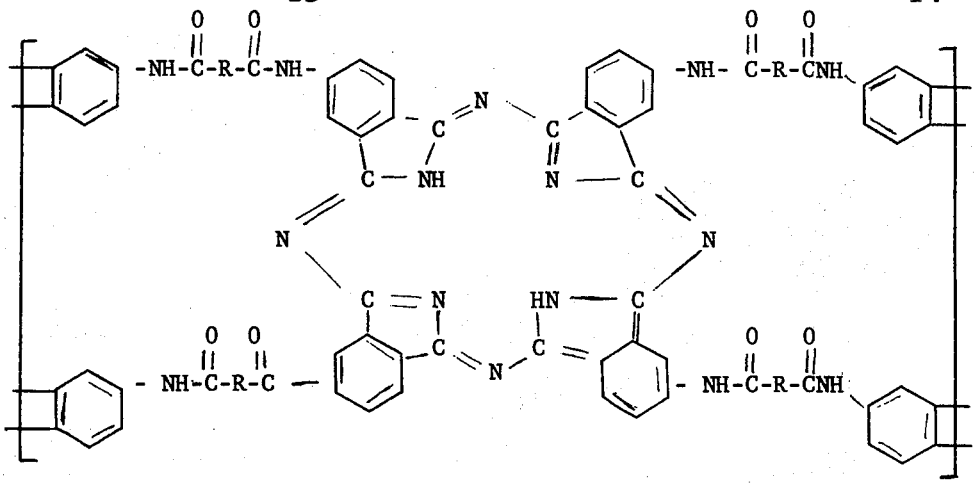
wherein $R = (CH_2)_{n-2}$, $(CH_2)_x CH(CH_3)(CH_2)_y$; $n = 3$ to 20; $x = 1$ to 8; and $y = 1$ to 8.
2. The composition of claim 1 wherein $R = (CH_2)_{n-2}$.
3. The composition of claim 2 wherein $n = 4$ to 18.
4. The composition of claim 2 wherein $n = 4$ to 10, 12–14, and 18.
5. The composition of claim 2 wherein $n = 7, 9, 10$–14, and 18.
6. The composition of claim 1 wherein $R = CH_2CH(CH_3)CH_2CH_2$.
* * * * *